United States Patent [19]

Reese et al.

[11] Patent Number: 4,567,835
[45] Date of Patent: Feb. 4, 1986

[54] MANUAL ADJUSTABLE TERMINAL TABLE

[75] Inventors: Charles Reese, Plainsboro, N.J.; David W. Fisher, Quakertown, Pa.

[73] Assignee: JG Furniture Systems, Inc., Quakertown, Pa.

[21] Appl. No.: 510,678

[22] Filed: Jul. 5, 1983

[51] Int. Cl.⁴ .............................................. A47F 5/12
[52] U.S. Cl. ........................................ 108/7; 108/92; 108/102; 248/188.8; 248/298
[58] Field of Search ....................... 108/7, 102, 59, 92; 248/397, 185, 424, 429, 250, 900, 298, 188.7, 188.8, 346.1, 129

[56] References Cited

U.S. PATENT DOCUMENTS

| 909,796 | 1/1909 | Hetterschied . | |
| 1,396,445 | 11/1921 | Loudon | 108/1 |
| 1,488,024 | 3/1924 | Nichols | 248/429 |
| 2,251,841 | 8/1941 | Herold | 108/1 |
| 3,445,143 | 5/1969 | Swenson | 248/429 |
| 3,485,189 | 12/1969 | Marco | 248/250 |
| 3,497,170 | 2/1970 | Armstrong | 248/188.7 |
| 3,672,721 | 6/1972 | Williams . | |
| 4,258,963 | 3/1981 | Fusselman et al. | 312/196 |
| 4,365,561 | 12/1982 | Tellier et al. | 108/59 |
| 4,373,761 | 2/1983 | Hansberry | 182/17 |

FOREIGN PATENT DOCUMENTS 83894  6/1963  France ................................ 108/1

OTHER PUBLICATIONS

Facit "CRT Terminal Table with Pneumatic Height Control" brochure.
*The Washington Post Magazine*, Mar. 27, 1983, Harney, "Compufurn High-Tech Furniture for a New Age".
Prepared document entitled "Commercially Available Adjustment Terminal Tables".

Primary Examiner—William E. Lyddane
Assistant Examiner—Joseph Falk
Attorney, Agent, or Firm—Cushman, Darby & Cushman

[57] ABSTRACT

A portable table assembly supports a terminal on the main table portion thereof, and a keyboard on the auxiliary table portion thereof. The tilt of the main table, the vertical heights of the main and auxiliary tables, and the linear distance between the main and auxiliary tables are adjustable by a user sitting in a normal position adjacent the auxiliary table. Locking casters on the bottoms of the mobile base for the table assemblies may be locked or unlocked also from the user's sitting position, and the combined center of gravity of the main and auxiliary tables overlies a central leg of the base. A handle mounted to the rear of the main table also stops the terminal from sliding off the rear of the main table, and provides for proper positioning of the cords leading to the terminal.

19 Claims, 6 Drawing Figures

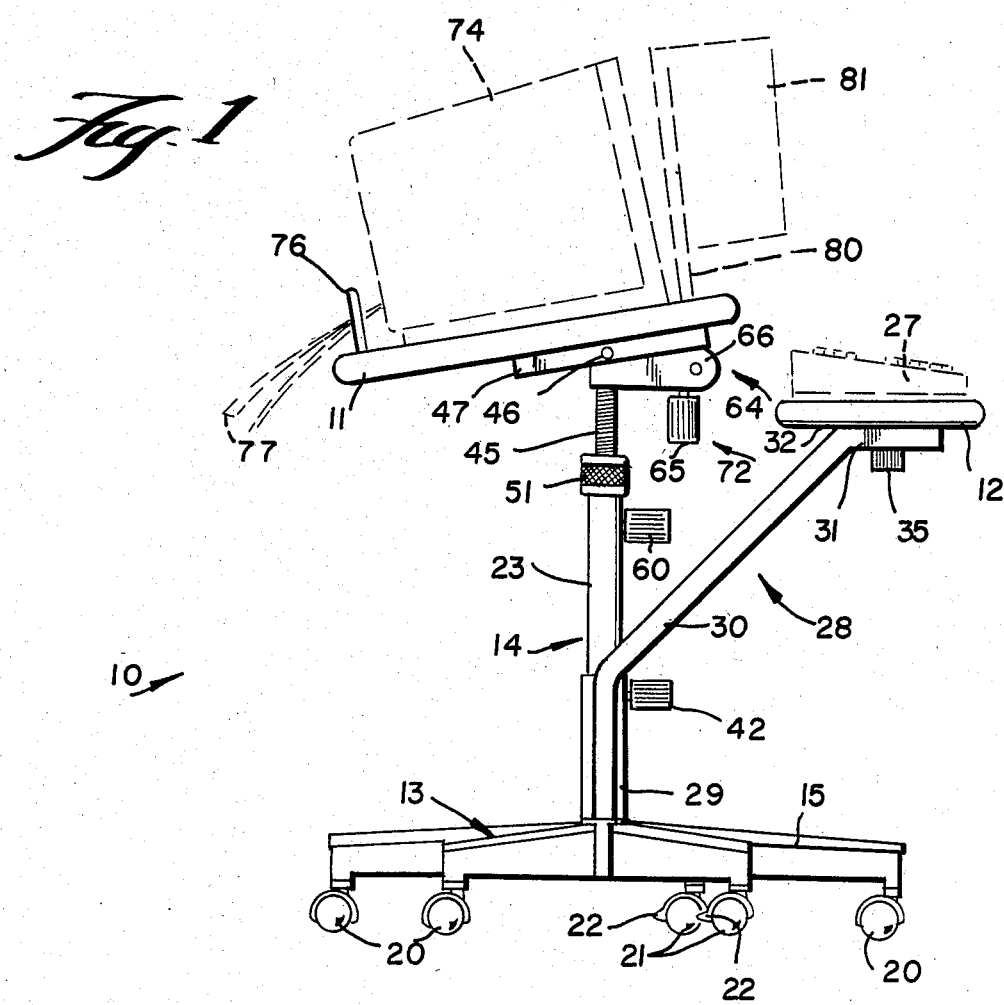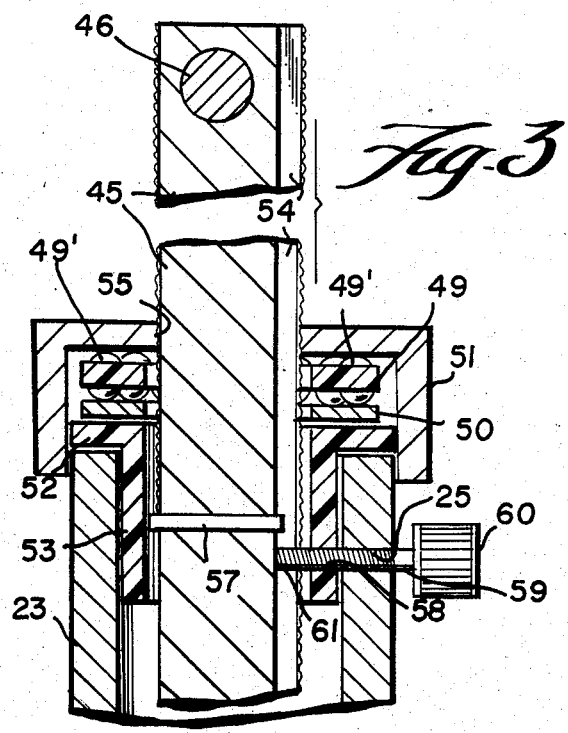

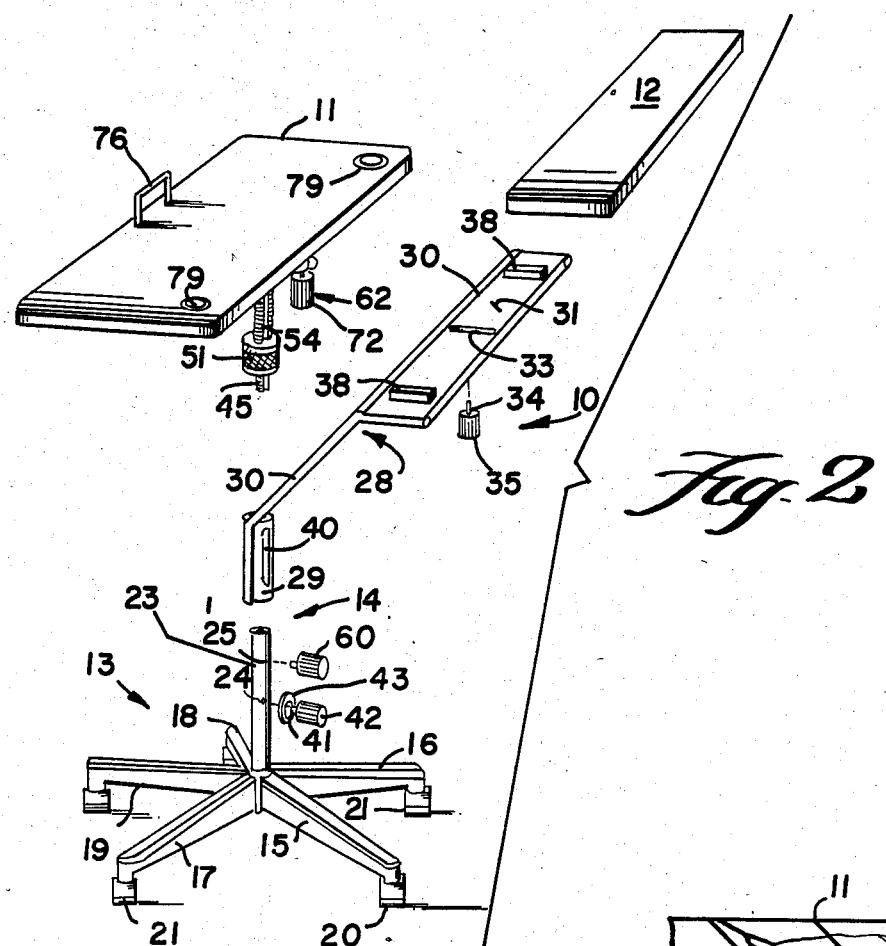
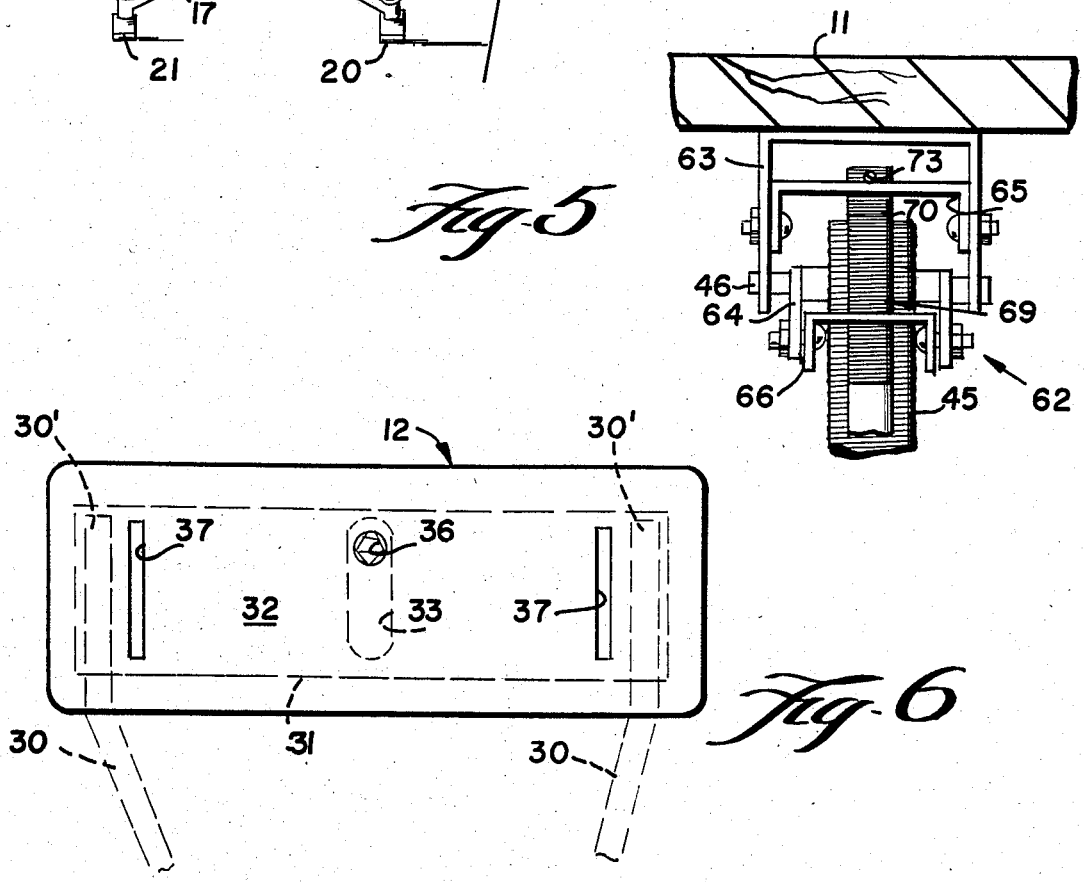

MANUAL ADJUSTABLE TERMINAL TABLE

BACKGROUND AND SUMMARY OF THE INVENTION

With the increasing popularity of portable terminals, keyboards, and other related electronic and computer equipment, the development of furniture for accommodating such equipment has been necessitated. Conventional typewriter tables, portable and stationary, and conventional desks have not been adequate to meet the needs of the users of portable terminals and the like.

A typical user-station for a computer comprises a terminal, typically with a screen and/or printer, and a keyboard. In order to maximize utility of the equipment at such a user-station, it is desirable that one be able to: tilt the screen to reduce glare, to adjust the screen height so that the user may view the screen without discomfort, to adjust the keyboard height to permit proper positioning of the wrists and arms when inputting data via the keyboard, and to adjust the linear keyboard-screen distance to compensate for the eyesight of the user. Also it is desirable to have the complete station mobile.

According to the present invention, a table assembly is provided which accomplishes all of the above objectives in a simple and easy manner. The table assembly according to the invention is also safe to utilize, both from the standpoint of protecting the operator and from the standpoint of protecting the equipment mounted thereby.

The structures providing for the adjustment of the keyboard and terminal with respect to each other are of simple design and relatively inexpensive to construct, yet provide for positive maintenance of the components in the positions to which they have been adjusted. All of the adjustments may be accomplished while the user is sitting in front of the table assembly in a normal operating position. Further although the table assembly is designed for mobility, it also includes structural components which minimize the possibility of tip-over of the terminal or the table assembly itself.

A table assembly according to the present invention includes a main and an auxiliary table. The main table is adapted to mount the computer terminal and screen, while the auxiliary table is adapted to mount a keyboard, and is vertically and horizontally spaced with respect to the main table. The tables are mounted on a common base, preferably one that is movable and has an odd number of legs, each with a caster, and some of the casters being of the locking-type. A central post extends upwardly from the base to which both tables are operatively attached.

The central tubular post receives a collar operatively connected to the auxiliary table, the collar slidable over the post to adjust the vertical position of the auxiliary table. The tubular post also receives an Acme screw therein and a threaded collar at the top of the tubular shaft is rotatable to adjust the vertical position of the main table with respect to the base. The Acme screw and the auxiliary table support collar are grooved and specifically aligned with one of the legs of the base so that the combined centers of gravity of the tables are directly over one of the legs of the base.

An adjustment knob is provided for each of the adjustment mechanisms: that is for limited tilt of the main table (±5° from horizontal) to reduce screen glare; vertical adjustment of the main table to allow the user to view the screen without discomfort; vertical adjustment of the auxiliary table to allow proper positioning of the user's wrists and arms when utilizing the keyboard; and adjustment of the linear spacing between the two tables to compensate for the user's eyesight. All these control knobs are essentially co-planar and mounted above the central supporting leg of the base.

Among the safety features preventing tip-over of the terminal or table assembly (besides the mounting of the center of gravity as described above) are locks on two of the casters. The locks on the casters are also readily accessible by the user from a normal sitting position since they are disposed on legs straddling the central leg of the base. Also, the tilt of the main table is positively limited, and a combination handle and stop is provided on the back of the main table to facilitate movement of the table assembly from place-to-place while at the same time preventing the terminal from sliding off the back, and providing a mechanism through which the power cords from the terminal may be threaded.

The table assembly according to the present invention is also versatile, the main table including a number of grommeted openings therein for the simple and readily removable mounting of auxiliary structures, such as a prop for copy.

It is the primary object of the present invention to provide a simple and safe table assembly having multiple adjustments of the main and auxiliary table portions thereof. This and other objects of the invention will become clear from an inspection of the detailed description of the invention and from the appended claims.

BRIEF DESCRIPTION OF THE DRAWINGS

FIG. 1 is a side view of an exemplary table assembly according to the present invention, with typical components to be used therewith shown in dotted line;

FIG. 2 is a top perspective exploded view of the table assembly of FIG. 1;

FIG. 3 is a detail cross-sectional view of the main table vertical height adjustment mechanism of the table assembly of FIG. 1;

FIG. 4 is a side cross-sectional view of the main table tilt adjusment mechanism of the table assembly of FIG. 1;

FIG. 5 is a front view of the mechanism of FIG. 4; and

FIG. 6 is a bottom plan view of the auxiliary table surface of the table assembly of FIG. 1, with the support for the table surface shown in dotted line.

DETAILED DESCRIPTION OF THE DRAWINGS

The table assembly 10 comprises as the main components thereof a main table 11, an auxiliary table 12, a base 13, and a support 14 interconnecting the base 13 and the tables 11, 12.

The base 13 preferably is a conventional mobile base having a plurality of legs 15, 16, 17, 18, and 19. At least three legs are provided, and preferably an odd number of equally spaced legs. One leg, the leg 15 in the embodiment illustrated in FIGS. 1 and 2, serves as the central leg with which the tables 11, 12 and adjustment mechanisms (to be hereinafter described) are aligned. The central leg 15 essentially bisects the rear legs 18, 19.

Conventional casters 20, 21 are provided on the bottom of the legs 15 through 19. The casters 21, on the legs 16 and 17 straddling the central leg 15, are locking double-wheel casters, such as those manufactured by the Shepherd Company. Foot-operated lock levers 22 are associated with the casters 21, and are readily accessible by a human user when in a sitting position with the human user's legs basically straddling the base center leg 15.

The support 14 preferably comprises a metal tube 23 which upstands vertically from the center of the base 13, and has a pair of vertically in-line screw threaded openings 24, 25 (see FIG. 2) formed therein. The openings 24, 25 in the central leg 15 are co-planar, and the openings 24, 25 are disposed on the same side of the tubular support 23 as the central leg 15.

The support mechanism for the auxiliary table 12, which is adapted to mount a keyboard (shown in dotted line by reference numeral 27 in FIG. 1) is shown generally by the reference numeral 28 and includes a collar 29 to which a pair of splayed support arms 30 are affixed, the support arms 30 extending upwardly and forwardly in a Y from the collar 29 to a support shelf 31. The support shelf 31 has a top planar surface which cooperates with a bottom planar surface 32 of the auxiliary table 12. The free ends 30' of arms 30 are splayed so that they are spaced a substantial distance apart (e.g., about 17 inches), as seen in FIG. 6.

In order to provide adjustment of the horizontal spacing between the tables 11 and 12, an adjustment means is provided for allowing linear adjustment between the table 12 and the shelf 31. Such adjustment is provided by an elongated slot 33 formed in the shelf 31, and elongated in the direction of adjustment, with a threaded rod 34 attached to an adjustment knob 35 adapted to pass through the slot 33 and into threaded engagement with the interiorly threaded hole 36 (see FIG. 6) formed in the bottom surface 32 of the auxiliary table 12. When the threaded shaft 34 is unscrewed by rotating the knob 35 so that the knob 35 does not clamp the shelf 31 and auxiliary table 12 together, adjustment of the linear position of the auxiliary table 12 with respect to the main table 11 may be effected.

Linear relative movement between components 12, 31 is guided by grooves 37 (see FIG. 6) formed in the bottom of table 12, and bars 38 extending upwardly from shelf 31 (see FIG. 2). Bars 38 fit in grooves 37, and have a shorter length, thus guiding reciprocation of table 12 with respect to shelf 31, and limiting the extent of reciprocation.

Adjustment of the vertical position of the auxiliary table 12 is accomplished by sliding the collar 29 up and down over the tubular support 23. A vertically elongated slot 40 is formed in the collar 29, and the threaded shaft 41 of adjustment knob 42 is adapted to pass through the slot 40 and into threaded engagement with the interiorly threaded opening 24. A nylon washer 43 is disposed between the adjustment knob 42 and the collar 29. When the knob 42 is rotated clockwise, the frictional force provided between the washer 43 and the tubular support 23 on opposite sides of the collar 29 holds the collar in the vertical position to which it has been adjusted. By rotating the knob 42 in the counterclockwise direction to release the clamping force, the vertical position of the collar 29 may be changed.

The adjustment knob 42, elongated slot 40 and collar 29, etc., in addition to providing means for effecting adjustment of the vertical position of the auxiliary table support 28 also provide means for positively aligning the support 28 in a desired position. The slot 40 extends in a common plane with the opening 24 and the central leg 15 so that the center of the support 28 will always overhang the central leg 15 of the base 13.

Vertical adjustment of the main table 11 is effected by vertically reciprocating threaded rod (Acme screw) 45 with respect to tubular support 23. The threaded rod 45 is fixed to the table 11 so that no vertical relative movement therebetween is possible, although relative pivotal movement therebetween is possible. This is accomplished by utilization of the pin 46 which extends through openings formed centrally in the flanges 47, 48 (see FIGS. 1 and 4) extending downwardly from the main table 11, and through a bore in the screw 45.

The components providing for reciprocation of the rod 45 with respect to the tubular support 23 to change the vertical position of the main table 11 with respect to the support 23 includes thrust bearing 49, metal washer 50, and scew cap 51. The thrust bearing 49 preferably is formed of a plastic material, such as nylon, with ball bearing portions 49' extending from both faces thereof. The interior of the thrust bearing 49 is smooth and larger than the outside diameter of the threaded rod 45. The metal washer 50 is placed between the bottom surface of the thrust bearing 49 and the top 52 of collar 53. The coller 53 preferably is also made of a synthetic material, such as nylon. The screw cap 51 has an interiorly threaded opening 55 through which the threaded rod 45 passes, the interiorly threaded opening 55 and the exteriorly threaded rod 45 cooperating. Roll pin 57 prevents threaded engagement of opening 55 and shaft 45, and thus limits upward movement of shaft 51 vis-a-vis tube 23.

In order to positively orient the main table 11 with respect to the base 13 and support 14, while also positively holding the screw 45 in the position to which it has been moved, the threaded shaft 59 and adjustment knob 60 are provided. The shaft 59 extends through the interiorly threaded opening 25 in the tubular support 23, and a corresponding opening 58 in collar 53, and the end 61 of the shaft 59 is adapted to abut the bottom of a vertically extending groove 54 formed in threaded rod 45, to frictionally engage the same. When the knob 60 is rotated clockwise, the tip 61 will engage the threaded rod 45 and prevent vertical movement thereof even should one attempt to rotate the screw collar 51. When the knob 60 is rotated in a counterclockwise direction, the tip 61 will still extend into the groove 54, and will ensure the desired orientation between the main table 11 and the support 14. Note that the groove 54 and opening 25 are in the same plane as the central leg 15 of the base 13.

The adjustment of the orientation of the main table 11 with respect to the horizontal (i.e., the tilt) is accomplished utilizing the mechanism 62 most clearly seen in FIGS. 1, 4 and 5.

The adjustment mechanism 62 comprises first and second sets of brackets 63, 64 receiving pivot pin 46 therein (see FIG. 5), with the bracket 63 attached to the underside of table 11. Bracket 63 includes a gimbal 65, and the bracket 64 includes a gimbal 66. The gimbals 65, 66 have unthreaded opening 67 (see FIG. 4) and threaded opening 68, respectively therein, for receipt of the shaft 69. The shaft 69 has a threaded portion 70 over the majority of the length thereof, but the portion 71 thereof is not threaded. An adjustment knob 72 is connected to the shaft 69. At the top of the shaft 69 is a roll pin 73 which prevents the top of the shaft from moving downwardly through the opening 67.

Rotation of the shaft 69, by grasping the knob 72, causes the top of shaft 69 to move the table 11 with respect to bracket 64 to tilt the table 11 about the horizontal axis defined by the pivot pin 46. The amount of tilt is limited by the roll pin 73 and the unthreaded portion 71 of shaft 69, so that the table 11 can tilt only about ±5° from true horizontal.

On top of the table 11, a combination handle-stop-cord guide 76 is provided. By grasping the handle 76 (with the casters 21 unlocked), an individual may readily move the table assembly 10. The structure 76 also prevents computer terminal (with screen), 74, or other structure support by main table 11, from sliding backwardly off the table, and additionally the power cables, and like cord or wires, 77 which extend to the terminal 74 are threaded through the structure 76, minimizing the chance that the terminal 74 will slide off of it.

Additionally, one or more grommeted openings 79 (see FIG. 2) are provided in the table 11. These grommeted openings are adapted to engage and hold in place any of a wide variety of auxiliary structures, such as a shaft 80 (see FIG. 1) of a copy prop 81.

As clearly illustrated in FIGS. 1 and 2, all of the adjustment knobs 42, 60, 51, 72, and 35—are positioned so that they are substantially co-planar with each other, and with the central leg 15 of base 13. In this wasy, the adjustment knobs may all be readily operated by a user sitting in a normal position adjacent the keyboard 12 (with the user's legs essentially straddling the central leg 15), and additionally the combined center of gravity of the tables 11, 12 is disposed directly over the central leg 15. As previously mentioned, the lock levers 22 for the caster 21 may also be readily accessed by the user in the normal sitting position.

The preferred use of the table assembly 10 is to mount a computer terminal, with a screen and/or printer, and a keyboard, such as the components illustrated in dotted line at 74 and 27, respectively, in FIG. 1. Thus the auxiliary table 12 is dimensioned so that it readily supports the keyboard 27, and the main table 11 is dimensioned so that it readily supports the computer terminal 74.

It will thus be seen that according to the present invention a simple, safe, and effective table assembly adapted to support a computer terminal and keyboard has been provided.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A table assembly comprising:
 a main table having a vertical position;
 an auxiliary table having a vertical position;
 a base;
 a support for interconnecting said base and said main and auxiliary tables;
 first adjustment means for adjusting the vertical position of said main table with respect to said base, said first adjustment means including a first adjustment knob;
 second adjustment means for providing the adjustment of the vertical position of said auxiliary table with respect to said main table and said base, said second adjustment means comprising a second adjustment knob;
 third adjustment means for providing adjustment of the angular orientation of said main table with respect to the horizontal, said third adjustment means comprising a third adjustment knob; and
 fourth adjustment means for providing adjustment of the horizontal spacing of said auxiliary table with respect to said main table, said fourth adjustment means comprising a fourth adjustment knob;
 said first, second, third, and fourth adjustment knobs each being distinct from the other, and all disposed on the same side of said support and in positions so that they are readily accessible by a user seated in a utilization position adjacent said auxiliary table.

2. An assembly as recited in claim 1 wherein all said adjustment knobs are disposed in essentially a common vertical plane.

3. An assembly as recited in claim 2 wherein said base comprises a mobile base having a plurality of legs, each leg having a caster at the bottom thereof, and said base including a central leg; and wherein said common plane of said adjustment knobs is essentially co-planar with said central leg.

4. An assembly as recited in claim 3 wherein said base includes a pair of legs straddling said central leg, and wherein said legs straddling said central leg each include a locking caster, with lock lever, at the bottom thereof, and wherein said lock levers of said locking casters are readily accessible by a user sitting in a normal utilization position adjacent said auxiliary table.

5. An assembly as recited in claim 3 wherein said base includes a pair of legs extending radially outwardly from said support on the opposite side thereof as said central leg and having an open angle therebetween; and wherein an imaginary extension of said central leg bisects said angle between said legs.

6. An assembly as recited in claim 1 wherein said third adjustment comprises: a first bracket; means for pivotally mounting said first bracket to said support for pivotal movement about a horizontal axis; a second bracket; gimbal means operatively connected to each of said first and second brackets; and a threaded shaft operatively received by said gimbal means, said third adjustment knob attached to said shaft, so that rotation of said shaft effects relative movement between said first and second brackets and thus pivotal movement of said main table about said horizontal axis.

7. An assembly as recited in claim 6 further comprising means for limiting the pivotal movement of said main table about said horizontal axis to about ±5° from true horizontal.

8. An assembly as recited in claim 1 wherein said first adjustment means, and said second adjustment means also comprise means for preventing substantial rotational movement of said tables with respect to said base.

9. An assembly as recited in claim 1 further comprising a structure mounted on the opposite side of said main table as said auxiliary table, said structure comprising handle means for facilitating movement of said table assembly, stop means for preventing movement of an article supported by said main table off the edge thereof opposite said auxiliary table, and means providing for positioning of cords or wires extending from an article disposed on said main table to a remote area.

10. An assembly as recited in claim 1 wherein said support comprises a vertically extending support tube; and further comprising an auxiliary table support means extending between said support tube and said auxiliary table, said auxiliary support means including: a collar disposed over said tubular support shaft; a planar shelf; and a pair of splayed arms extending upwardly and horizontally from said collar to said shelf and rigidly connected to each.

11. An assembly as recited in claim 10 wherein said second adjustment means comprises: an elongated slot formed in said collar; an interiorly threaded opening formed in said tubular support, and in alignment with said elongated slot; an exteriorly threaded shaft extending from said second adjustment knob and adapted to cooperate with said tubular shaft interiorly threaded hole and said collar elongated slot; and a nylon washer disposed between said second adjustment knob and said collar and surrounding said threaded shaft.

12. An assembly as recited in claim 11 wherein said fourth adjustment means comprises means defining an elongated slot in said shelf, said slot extending substantially perpendicular to said tubular support; an interiorly threaded opening formed in the bottom of said auxiliary table; and an exteriorly threaded shaft attached to said fourth adjustment knob, said threaded shaft cooperating with said interiorly threaded opening formed in the bottom of said auxiliary table, and said shaft adapted to pass through said slot formed in said shelf.

13. An assembly as recited in claim 10 wherein said fourth adjustment means comprises means defining an elongated slot in said shelf, said slot extending substantially perpendicular to said tubular support; an interiorly threaded opening formed in the bottom of said auxiliary table; an exteriorly threaded shaft attached to said fourth adjustment knob, said threaded shaft cooperating with said interiorly threaded opening formed in the bottom of said auxiliary table, and said shaft adapted to pass through said slot formed in said shelf; and bar and groove means formed on said shelf and in the bottom of said auxiliary table for positively guiding linear movement between said shelf and said table.

14. A table assembly comprising:
a main table having a vertical position;
an auxiliary table having a vertical position;
a base comprising a plurality of legs, with a caster extending downwardly from the bottom of each of said legs;
a tubular support extending upwardly from said base and operatively interconnecting said main and auxiliary tables to said base;
first means for adjusting the vertical position of said auxiliary table with respect to said base; and
second means for adjusting the vertical position of said main table with respect to said base and said auxiliary table, and positively maintaining the angular orientation of said main table with respect to said base, and second adjustment means comprising:
an exteriorly threaded rod;
a screw cap having an interiorly threaded opening adapted to cooperate with the exterior threads on said grooved threaded rod; and
a thrust bearing operatively disposed between said tubular support and said screw cap, and having a central opening through which said threaded rod passes.

15. An assembly as recited in claim 14 wherein said rod has a groove formed along at least a portion of the length thereof; and wherein said second adjusting means further comprises means defining an interiorly threaded opening in the side of said tubular support; an adjustment knob attached to a threaded shaft, said shaft having threads cooperating with said tubular shaft interiorly threaded opening; and said threaded shaft extending through said opening into said groove of said threaded rod.

16. An assembly as recited in claim 14 wherein said support comprises a vertically extending support tube; and further comprising an auxiliary table support means extending between said support tube and said auxiliary table, said auxiliary support means including: a collar disposed over said tubular support shaft; a planar shelf; and a pair of splayed arms extending upwardly and horizontally from said collar to said shelf and rigidly connected to each.

17. An assembly as recited in claim 16 wherein said first adjustment means comprises: an elongated slot formed in said collar; an interiorly threaded opening formed in said tubular support, and in alignment with said elongated slot; an exteriorly threaded shaft extending from an adjustment knob and adapted to cooperate with said tubular shaft interiorly threaded hole and said collar elongated slot; and a nylon washer disposed between said adjustment knob and said collar and surrounding said threaded shaft.

18. A table assembly comprising:
a main table;
an auxiliary table;
a base comprising a plurality of legs, with a castor extending downwardly from the bottom of each of said legs;
a support extending upwardly from said base and operatively interconnecting said main and auxiliary tables to said base; and
means for adjusting the angular orientation of said main table with respect to the horizontal so that said main table is angularly adjustable a few degrees, and only a few degrees, about a single horizontal axis, said adjustment means comprising: a first bracket rigidly connected to the underside of the main table; means for pivotally mounting said first bracket to said support for pivotal movement about a horizontal axis; a second bracket; a gimbal means operatively connected to each of said first and second brackets; and a threaded shaft received by an opening in each of said gimbal means, and an adjustment knob attached to said shaft, so that rotation of said shaft effects relative movement between said first and second brackets and thus pivotal movement of said main table about said horizontal axis.

19. An assembly as recited in claim 18 wherein one of said legs of said base is a central leg, and wherein said auxiliary table is mounted so that it always overhangs said central leg; and wherein a plane containing said central leg is essentially perpendicular to a plane containing said horizontal axis.

* * * * *